No. 827,529. PATENTED JULY 31, 1906.
L. A. HICKS.
ROTARY ENGINE.
APPLICATION FILED OCT. 10, 1905.

No. 827,529. PATENTED JULY 31, 1906.
L. A. HICKS.
ROTARY ENGINE.
APPLICATION FILED OCT. 10, 1905.

Witnesses:
R. E. Hamilton
W. C. Single

Inventor,
Linus A. Hicks
By Warren D. House,
His Attorney

No. 827,529.

PATENTED JULY 31, 1906.

L. A. HICKS.
ROTARY ENGINE.
APPLICATION FILED OCT. 10, 1905.

Witnesses:
R. E. Hamilton
W. C. Singles

Inventor
Linus A. Hicks
By Warren D. House,
His Attorney.

No. 827,529. PATENTED JULY 31, 1906.
L. A. HICKS.
ROTARY ENGINE.
APPLICATION FILED OCT. 10, 1905.

Witnesses:
R. E. Hamilton
W. C. Singler

Inventor,
Linus A. Hicks
By Warren D. House
His Attorney

THE NORRIS PETERS CO., WASHINGTON, D. C.

No. 827,529. PATENTED JULY 31, 1906.
L. A. HICKS.
ROTARY ENGINE.
APPLICATION FILED OCT. 10, 1905.

Witnesses:
R. E. Hamilton.
W. A. Single.

Inventor
Linus A. Hicks
By Warren D. House,
His Attorney.

THE NORRIS PETERS CO., WASHINGTON, D. C.

No. 827,529. PATENTED JULY 31, 1906.
L. A. HICKS.
ROTARY ENGINE.
APPLICATION FILED OCT. 10, 1905.

Witnesses:
R. E. Hamilton
W. C. Singles

Inventor,
Linus A. Hicks
By Warren D. House
His Attorney.

UNITED STATES PATENT OFFICE.

LINUS A. HICKS, OF KANSAS CITY, MISSOURI, ASSIGNOR TO WILLIAM R. BREWER, OF MILWAUKEE, WISCONSIN.

ROTARY ENGINE.

No. 827,529.      Specification of Letters Patent.      Patented July 31, 1906.

Application filed October 10, 1905. Serial No. 282,215.

*To all whom it may concern:*

Be it known that I, LINUS A. HICKS, a citizen of the United States, residing at Kansas City, in the county of Jackson and State of Missouri, have invented new and useful Improvements in Rotary Engines, of which the following is a specification.

My invention relates to improvements in rotary engines.

The object of my invention is to provide a rotary engine having a cylinder in which are mounted a plurality of pistons, means being provided by which the motive fluid is admitted to the cylinder and against the pistons in consecutive order, each piston during a revolution being subjected first to the direct and then to the expansive pressure of the fluid, some one of the pistons at any time being impelled by the direct pressure and the other pistons being under the expansive pressure of the motive fluid.

My invention provides, further, a novel construction by means of which the direction of rotation of the pistons may be quickly changed.

My invention provides, further, novel means for sealing the pistons against leakage around them of the motive fluid.

Other novel features are hereinafter fully described and claimed.

In the accompanying drawings, illustrative of my invention.

Similar characters of reference denote similar parts.

1 denotes the horizontal base of the engine, upon the upper side of which is mounted the engine-cylinder 2 of any desirable form and having, preferably, a horizontal cylindrical bore in which the pistons are located.

3 denotes the two cylinder-heads secured one to each end of the cylinder 2.

Figure 1:
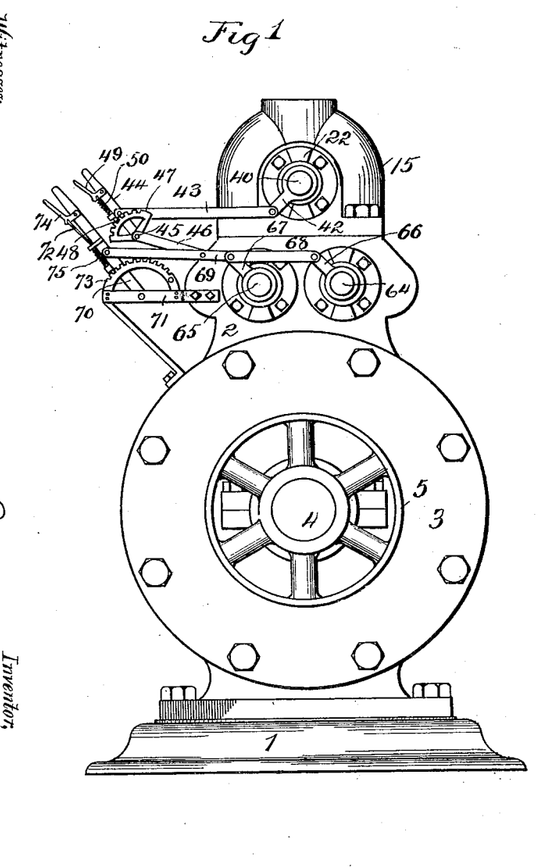
Figure 1 is an elevation view looking at one end of the engine.
Figure 2:
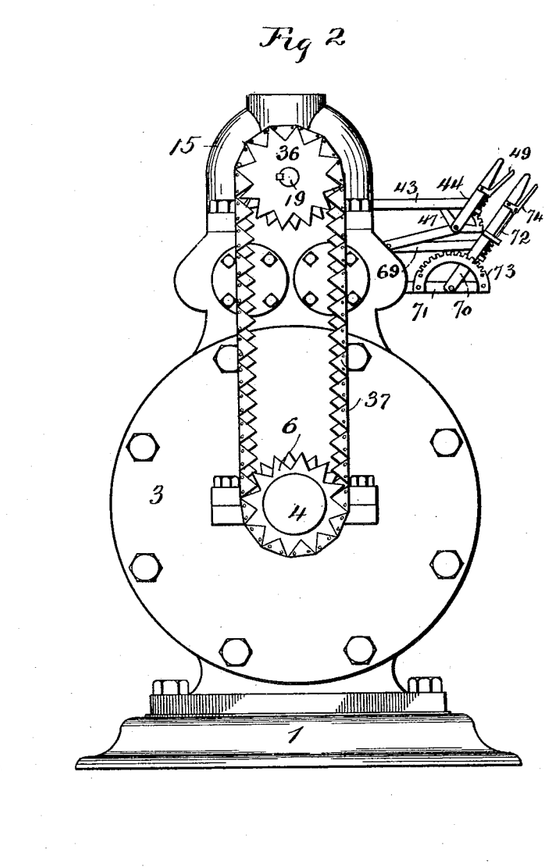
Fig. 2 is an elevation view looking at the other end of the engine.
Figure 3:
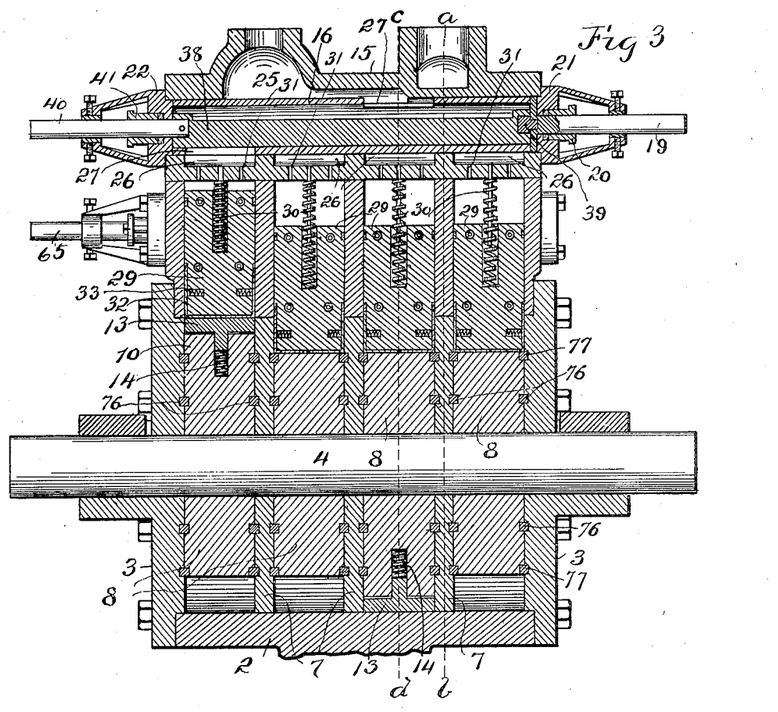
Fig. 3 is a vertical longitudinal central sectional view with the base broken away.
Figure 4:
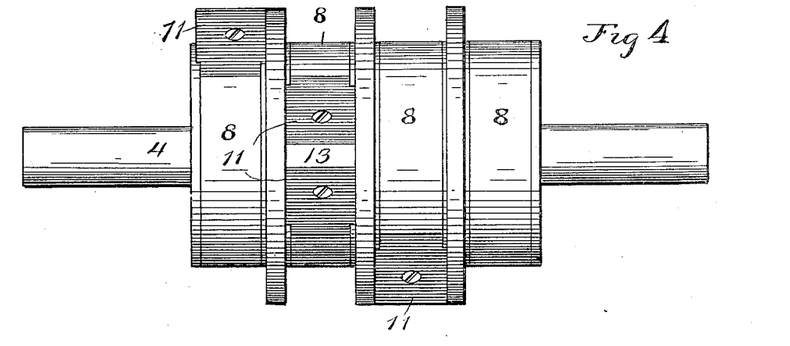
Fig. 4 is a side elevation view of the engine-shaft and pistons mounted thereon.
Figure 5:
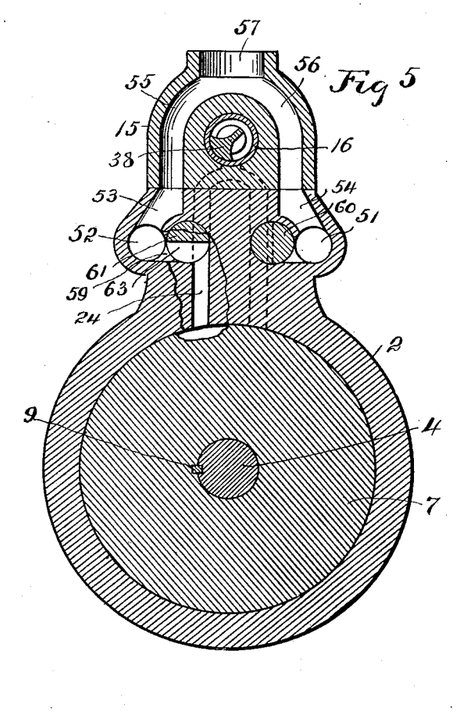
Fig. 5 is a transverse vertical sectional view taken on the dotted line *a b* of Fig. 3.
Figure 6:
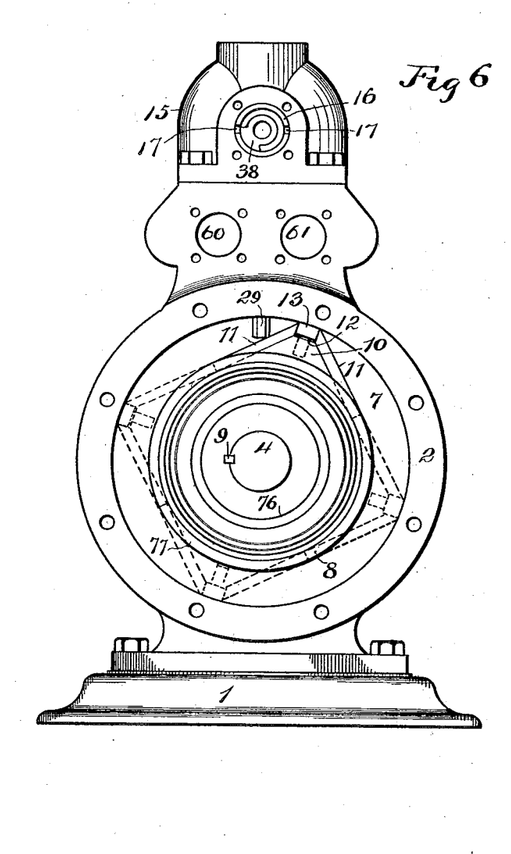
Fig. 6 is an elevation view looking at the engine as shown in Fig. 2, the cylinder-head, valve-driving mechanism, and some of the other parts being removed.
Figure 7:
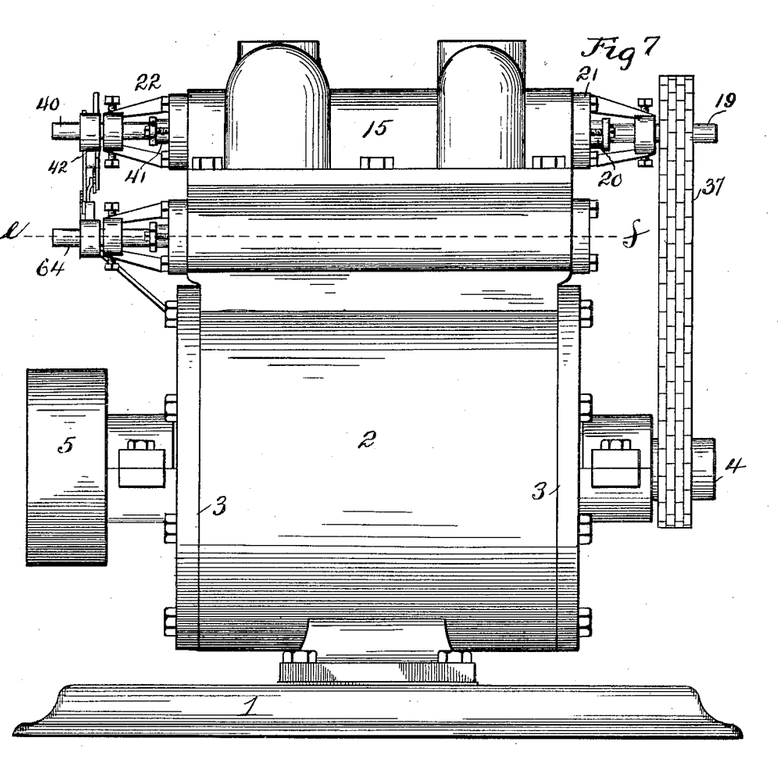
Fig. 7 is a side elevation view of the engine.
Figure 8:
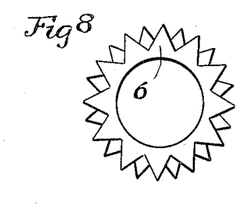
Fig. 8 is an end elevation view of one of the sprocket-wheels.
Figure 9:
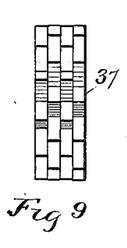
Figs. 9, 10, and 11 are inner, outer, and side elevation views of a portion of the sprocket-valve-driving chain.
Figure 10:
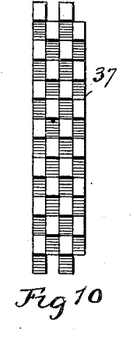
Figure 11:
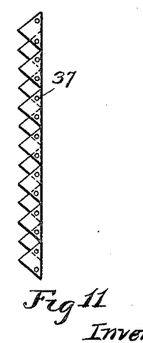
Figure 12:
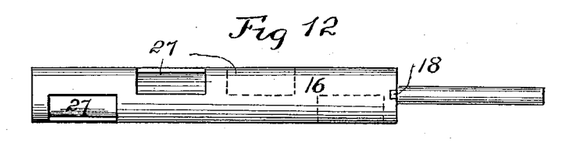
Fig. 12 is a side elevation view of the rotary tubular valve.
Figure 13:
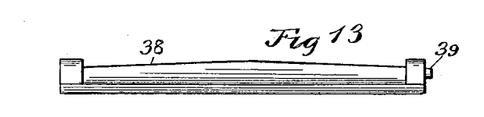
Fig. 13 is a side elevation view of the oscillatory valve.
Figure 14:
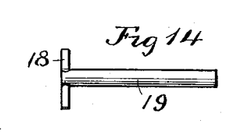
Figs. 14 and 15 are side and end elevation views, respectively, of the stem of the tubular valve.
Figure 15:
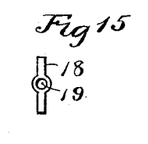

4 denotes a horizontal rotary shaft, disposed, preferably, concentrically in the cylinder and extending through and rotatively mounted in suitable bearings provided in the cylinder-heads 3. Upon one end of the shaft 4 is mounted a pulley 5 for carrying power from the engine, and upon the other end of the shaft is mounted and rotatable therewith a sprocket-wheel 6, the peculiarities and function of which are described hereinafter. The bore of the cylinder is preferably transversely divided into a plurality of compartments by means of the vertical disks 7, each having a central hole through which the shaft 4 extends and the peripheries of which are closely fitted to the inner periphery of the cylinder 2. A plurality of pistons 8 are mounted on and rotatable with the shaft 4 and are disposed one in each compartment formed by the heads 3 and partition disks or plates 7. The body of each piston 8 is preferably of general cylindrical form, mounted concentrically on the shaft 4, to which it is secured by longitudinal key 9, located in suitable keyways provided, respectively, in the piston and the shaft 4. Each piston 8 is provided with a peripheral head 10, adapted to receive the impact of the motive fluid by which the piston is driven. Each piston-head 10 is provided with two steel plates 11, secured to the periphery of the piston and having their outer surfaces converging toward each other and disposed tangentially relative to the periphery of the piston. To prevent the passage of steam past the piston-heads, each piston-head is provided with a radial peripheral recess 12, in which is slidably mounted a sealing-plate 13, extending lengthwise the full length of the piston at its outer end, which outer end is held in contact with the inner periphery of the cylinder by means of a coil-spring 14, located in the recess 12 and bearing at one end against the piston and at its outer end against the inner end of the sealing-plate 13. The upper end of the cylinder is preferably flat and has secured to it the steam-chest 15, which is provided with a horizontal opening or passage, preferably cylindrical in form, in which is fitted rotatively a horizontal tubular valve 16, having, as shown in Fig. 6, at one end two diametrically opposite notches 17, in which is mounted the head 18 of a T-shaped valve-stem, the horizontal portion 19 of which is rotatively mounted in a stuffing-box 20, secured centrally in a cap 21, having its inner end fitted in the end of the cylindrical passage of the steam-chest and rigidly secured to one end of said steam-chest. In the other end of the cylindrical passage of the steam-chest is secured the inner end of a similar cap 22.

Figures 20, 21, 22:
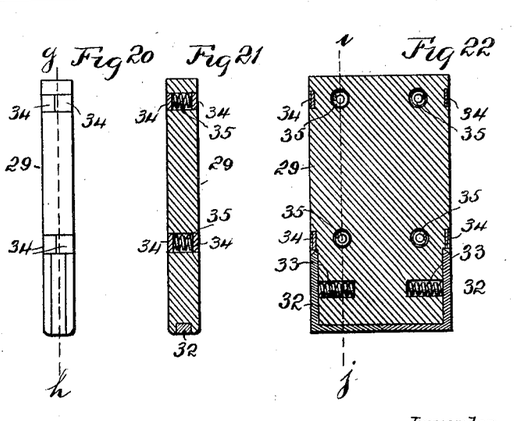
Fig. 21 is a vertical sectional view taken on the dotted line *i j* of Fig. 22.
Fig. 22 is a vertical sectional view taken on the dotted line *g h* of Fig. 20.

Referring to Figs. 16, 17, and 18, 23 and 24 denote, respectively, two series of vertical passages for admitting the motive fluid from the steam-chest into the cylinder. The two series of passages are disposed, preferably, in two longitudinal rows, the passages of opposite series being disposed in pairs, one pair communicating with each compartment of the cylinder, mechanism being provided, as hereinafter described, by means of which either series of passages may be changed from inlet to exhaust ports or from exhaust to inlet ports for the purpose of reversing the direction of the running of the engine. The steam-chest is provided with an inlet-passage 25, through which the motive fluid under pressure may be admitted into the cylindrical passage containing the valve 16. The passage containing the valve 16 communicates at its lower side with a series of longitudinally-disposed eduction-openings 26, the bifurcated lower ends of which communicate each opening 26 with the upper ends of a pair of the passages 23 and 24. The tubular valve 16 is provided around its periphery with a plurality of openings 27, so disposed that as the said valve is rotated the openings 27 will be brought in consecutive order in register with the openings 26, the disposition of said openings 27 being such that at any time during a revolution of the valve 16 one of said openings 27 will be in communication with one of the openings 26. The induction-opening 25 is disposed relative to the valve 16 so that at any time one of the openings 27 will be in open communication with the induction-opening 25, thus affording a constant supply of the motive fluid to the interior of the valve 16, which by the disposition of the openings 27 will open and close in consecutive order the openings 26. A series of vertical openings 28 are provided in the cylinder, one between each pair of passages 23 and 24. In the openings 28 are slidably mounted, respectively, a plurality of plates 29, the lower ends of which bear, respectively, upon the peripheries of the pistons 8, said plates 29 constituting a series of abutments mounted one in each compartment of the cylinder. Each abutment 29 is provided in its upper end with a vertical hole in which is mounted a coil-spring 30, the upper end of which bears upon the lower side of the steam-chest 15 and the lower end of which bears upon the abutment. The tension of the springs 30 tend to retain the abutments 29 in contact with the pistons 8, respectively. A series of passages 31 connect the openings 26 with the openings 28, whereby the upper ends of the abutments 29 may be subjected to the pressure of the motive fluid. The lower end of each abutment 29 is provided with a longitudinal groove communicating at its ends with two vertical grooves provided in the vertical edges and lower part of the abutment. In said grooves are mounted upon each abutment 29 two L-shaped plates 32, the outer vertical sides of which are held in contact with the adjacent sides of the partition-disks 7, respectively, by means of horizontal coil compression-springs 33, mounted in recesses provided one in each vertical edge of each abutment 29, as shown in Fig. 22. The L-shaped plates 32 serve to prevent the passage of the motive fluid past the edges of the abutments. To prevent the passage of the motive fluid vertically through the passages 28 and past the sides of the abutments 29, each of the abutments 29 is provided with two sets of horizontal grooves disposed one set above the other, each set of grooves forming a continuous channel along the two sides and two vertical edges of the abutment, in which channel are mounted two horizontally-disposed U-shaped sealing-plates 34, the arms of each set of sealing-plates 34 extending toward each other, said sealing-plates 34 being normally forced outwardly in contact with the adjacent sides of the passages 28 by means of the coil-springs 35, located, respectively, between the plates 34 in suitable horizontal holes extending through each abutment-plate 29, two of said holes 35 being provided between each set of U-shaped sealing-plates 34.

In order to synchronously rotate the valve 16 with the shaft 4, the valve-stem 19 has secured to and rotatable with it a sprocket-wheel 36 of the same diameter as the sprocket-wheel 6 and connected to said sprocket-wheel 6 by a chain belt 37. (Shown in Figs. 2, 7, 9, 10, and 11. Each of the sprocket-wheels 6 and 36 comprises a plurality of peripherally-toothed plates secured together, the teeth of alternate plates being disposed opposite the recesses of the adjacent plates. The chain belt 37 comprises a plurality of rows of triangular-shaped plates, the plates of alternate rows being disposed with the apices of the plates opposite the V-shaped spaces between the plates of adjacent rows and each plate being pivotally connected adjacent its two ends to the adjacent two plates in the row contiguous to it. The arrangement of the plates in the belt 37 is such that as the belt passes over the wheels 6 and 36 the triangular plates of the belt will fit, respectively, between the teeth of the sprocket-wheel, the points of the teeth of said wheels extending between and past the points of pivotal connection between the plates of the belt. A direct driving connection between the belt and the wheels is thus afforded, and owing to the shape and disposition of the plates of the belt and the teeth of the wheels slippage between the wheels and belt is avoided.

Figure 16:
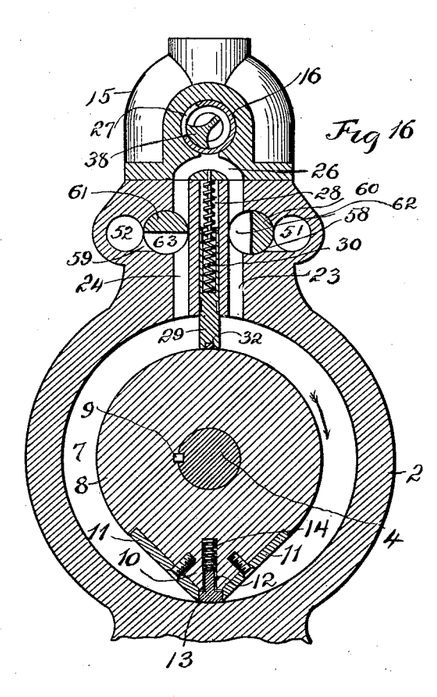
Fig. 16 is a vertical sectional view taken on the dotted line *c d* of Fig. 3.
Figure 17:
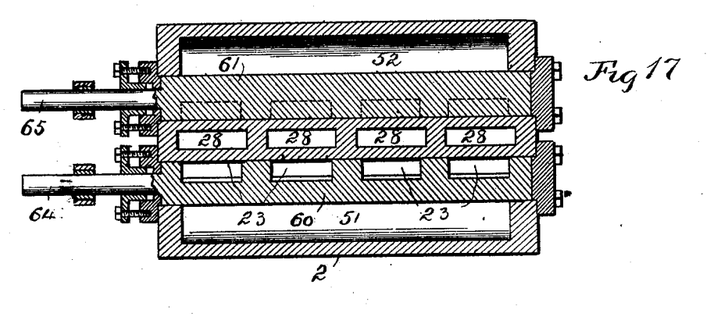
Fig. 17 is a horizontal sectional view taken on the dotted line *e f* of Fig. 7.
Figure 18:
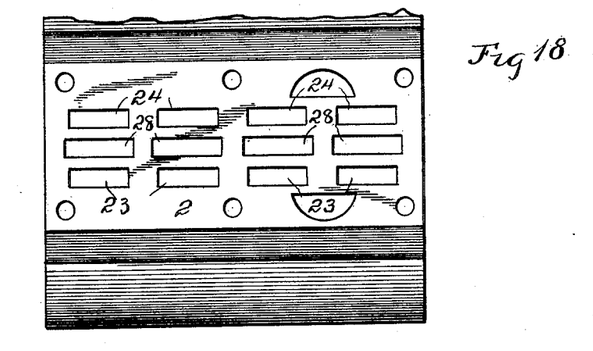
Fig. 18 is a top view of a portion of the engine-cylinder, the cylinder-heads and steam-chest being removed.
Figure 19:
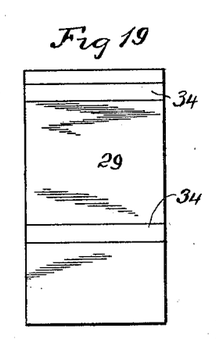
Figs. 19 and 20 are side and edge elevation views, respectively, of one of the movable cylinder-abutments.

To regulate the amount of motive fluid admitted to the cylinder, so that the proper amount shall be admitted proportionate to the speed of the engine, the following described mechanism is provided. In the tubular valve 16 is mounted a longitudinal oscillatory horizontal valve 38, the body of which is in the form of a segment of a cylinder, the outer periphery of which fits the inner periphery of the valve 16. The disposition of the valve 38 is such that by shifting the valve to and fro it may be made to cover more or less the upper ends of the openings 26, which communicate with the passages 23 and 24. One end of the valve 38 is provided with a central stud 39 rotatively mounted in a central hole provided in the inner end of the stem 19. In the other end of the valve 38 is rigidly and centrally secured the inner end of a horizontal stem 40, oscillatively mounted in bearings centrally provided therefor in the cap 22. Encircling the stem 40 and engaging the cap 22 is a stuffing-box 41. Secured to the outer end of the stem 40 is a crank-arm 42, to which is connected one end of a horizontal link 43, the other end of which is pivotally connected to a lever 44, pivotally mounted at 45 to the outer end of an arm 46, the inner end of which is secured to and supported by the cylinder. Upon the arm 46 is secured a peripherally-toothed segment 47, the teeth of which are adapted to be engaged by one end of a bolt 48, slidably mounted upon the lever 44 and pivotally connected at one end to a bell-crank lever 49, pivoted to the lever 44. The coil-spring 50, connected at one end to the lever 44 and at the other end to the bell-crank lever 49, serves to normally retain the bolt 48 engaged with the teeth of the segmental plate 47. To shift the valve 38 so as to open or close, more or less, the openings 26, the bell-crank lever 49 is swung so as to withdraw the bolt 48 from engagement with the teeth of the segmental plate 47, after which the lever 44 may be swung to the position desired. In the upper end of the cylinder and adjacent each side thereof are provided two horizontal passages 52 and 51, respectively, which are connected, respectively, by means of upwardly-extending passages 53 and 54 with the lower ends of two passages 55 and 56, the upper end of which communicate with the exhaust-passage 57. The passages 23 are connected each with the passage 51 by the exhaust-ducts 58. Exhaust-ducts 59 similarly connect the passages 24 with the passage 52. The cylinder is provided at each side of the openings 28 with two cylindrical longitudinal openings intersecting, respectively, the passages 23 and the exhaust-ducts 58 and the passages 24 and the exhaust-ducts 59. In said two cylindrical openings are mounted two oscillatory valves 60 and 61, respectively. Each of the valves 60 and 61 is provided with a plurality of transverse passages 62 and 63, respectively. The passages 62 and 63 are so disposed that when the valves 60 and 61 are properly disposed the passages 62 and 63 will be in alinement, respectively, with the passages 23 and 24, and when the valves 60 and 61 are oscillated from this position to right angles thereto the passages 23 and 24 will be closed and the passages 62 and 63 disposed in register with the exhaust-ducts 58 and 59. The relative disposition of the valves 60 and 61 is such that, as shown in Fig. 16, when the passages 23 are open the passages 24 will be closed, thus permitting the motive fluid to enter the cylinder through the passages 23, the exhaust taking place through the passages 24, 63, and 59. By oscillating the valves 60 and 61 to the opposite position the passages 24 will be opened and will become the inlet-port, while the passages 23 will be closed above the exhaust-ducts 58, the exhaust in this instance taking place through the passages 23, 62 and 51. The valves 60 and 61 are provided at similar ends with horizontal stems 64 and 65, having secured thereto, respectively, two crank-arms 66 and 67, pivotally connected each to a horizontal link 68, which in turn is pivotally connected to a link 69, pivotally connected in turn to a lever 70, pivoted at its lower end to a horizontal arm 71, secured to the cylinder 2. Slidably mounted on the lever 70 is a bolt 72, one end of which is adapted to engage the teeth provided on the periphery of the segmental plate 73, which in turn is supported by the plate 71. The other end of the bolt 72 is pivotally connected to a bell-crank lever 74, pivoted to the lever 70. A spring 75, carried by the lever 70, normally tends to force the bolt 72 into engagement with the teeth of the segmental plate 73. By properly moving the bell-crank lever 74 the bolt 72 may be disengaged from the plate 73, after which by properly swinging the lever 70 the valves 60 and 61 may be swung to the proper position. The peripheral heads 10 of the pistons 8 are all disposed radially in different positions relative to each other, the arrangement of the piston-heads being such that as the valve 16 revolves, consecutively opening the passages 26, the piston-heads will be positioned each so as to just clear its inlet-port, comprising one of the passages 23 or 24, as the case may be. To seal the pistons, each end of each piston is provided with two annular grooves disposed concentrically with the shaft 4, one inside the other. In each of the inner grooves is rigidly secured a ring 76, rotatively mounted in the adjacent plate forming one side of the compartment in which the piston is located. Opposite the outer grooves in the heads 3 and partition-plates 7 are provided similar annular grooves in which are rigidly secured sealing-rings 77, the pistons being rotatable, respectively, between said rings.

In operating my invention the lever 70 is swung to a position in which the valves 60 and 61 will be in positions suitable for admitting the motive fluid through the passages 23 or 24, as the case may be, depending upon the direction it is desired to rotate the shaft 4. When it is desired to rotate the shaft in the direction indicated by the arrow in Fig. 16, the lever 70 is swung to a position in which the valves 60 and 61 will be located as shown in Fig. 16. The motive fluid is then admitted into the passage 25, passing thence through one of the passages 27 into the hollow valve 16, through which it escapes into the open passage 26, which may happen at this time to be in alinement with one of the openings 27. The motive fluid then passes through the passage 23, communicating with the open passage 26 into the cylinder, at which time the piston-head which receives impact of the motive fluid entering this passage 23 will be in a position just clearing the said passage, as represented in Fig. 6. The direct pressure of the motive fluid exerted on the said piston-head will rotate the shaft 4 in the direction indicated by the arrow in Fig. 16. The shaft 4 in rotating will impart synchronous rotation in the manner already described to the valve 16. When the valve 16 has been rotated to a position in which the next peripheral opening 27 will be in alinement with the next passage 26, the first passage 27 will have passed beyond the first passage 26, thus cutting off admission of the motive fluid through the first passage 23. The first-named piston-head during the remainder of the revolution will be impelled by the expansive pressure of the motive fluid. In a like manner each piston-head during a revolution will be successively impelled first by direct and then by the expansive pressure of the motive fluid, some one of the pistons at any time being subjected to the full direct pressure of the motive fluid, while the other pistons are running under the expansive pressure thereof. Owing to the formation of the piston-heads and the manner in which the abutments are supported on the pistons, the pistons may be rotated in either direction without difficulty.

My invention may be variously modified without departing from its spirit.

Having thus described my invention, what I claim, and desire to secure by Letters Patent, is—

1. In a rotary engine, the combination with the cylinder having in its upper portion a pair of inlet-ports, said upper portion of the cylinder also having a pair of exhaust-ports arranged outside of the inlet-ports, lateral exhaust-ducts connecting the inlet-ports with the exhaust-ports, and valves arranged in said exhaust-ducts for controlling communication between the inlet-ports and the exhaust-ports, of a piston rotatably mounted in said cylinder, an abutment slidably mounted between said inlet-ports and working against the periphery of the piston, a valve-chest arranged upon the upper portion of the cylinder, a valve arranged therein for controlling the flow of the motive agent to said piston, the chamber of said valve communicating with the inlet-ports, whereby the latter are supplied with the motive agent, and means for actuating said valve in synchronism with the piston.

2. In a rotary engine, the combination with the cylinder having in its upper portion a pair of inlet-ports, said upper portion of the cylinder also having a pair of exhaust-ports arranged outside of the inlet-ports, lateral exhaust-ducts connecting the inlet-ports with the exhaust-ports, and valves arranged in said exhaust-ducts for controlling communication between the inlet-ports and the exhaust-ports, of a piston rotatably mounted in said cylinder, an abutment slidably mounted between said inlet-ports and working against the periphery of the piston, a valve-chest arranged upon the upper portion of the cylinder, a tubular valve arranged therein for controlling the flow of the motive agent to said piston, said valve having an opening for establishing communication between the interior of the valve and said inlet-ports, whereby the latter are supplied with the motive agent, means for actuating said valve in synchronism with the piston, a cut-off valve arranged in said tubular valve, and means for actuating said cut-off valve for regulating the degree of cut-off.

3. In a rotary engine, the combination with the cylinder having in its upper portion a pair of inlet-ports, said upper portion of the cylinder also having a pair of exhaust-ports arranged outside of the inlet-ports, lateral exhaust-ducts connecting the inlet-ports with the exhaust-ports, valves arranged in said exhaust-ducts for controlling communication between the inlet-ports and the exhaust-ports, and means for simultaneously actuating said valves for opening one of the inlet-ports and closing the other to exhaust through the latter, whereby the direction of rotation of the piston is determined, of a piston rotatably mounted in said cylinder, an abutment slidably mounted between said inlet-ports and working against the periphery of the piston, a valve-chest arranged upon the upper portion of the cylinder, a valve arranged therein for controlling the flow of the motive agent to said piston, the chamber of said valve communicating with the inlet-ports, whereby the latter are supplied with the motive agent, and means for actuating said valve in synchronism with the piston.

4. In a rotary engine, the combination with the cylinder having in its upper portion a series of inlet-ports arranged in pairs, said upper portion of the cylinder also having a pair of exhaust-ports arranged outside of the inlet-ports, lateral exhaust-ducts connecting the inlet-ports with the exhaust-ports, and valves arranged in said exhaust-ducts for controlling communication between the inlet-ports and the exhaust-ports, of a plurality of pistons rotatably mounted in said cylinder and arranged in separate compartments therein, one pair of said inlet-ports communicating with each of said compartments, an abutment slidably mounted between the inlet-ports of each pair and working against the periphery of the contiguous piston, a valve-chest arranged upon the upper portion of the cylinder, a valve arranged therein for controlling the flow of the motive agent to said piston, said valve having a series of openings formed therein and registering consecutively with the respective pairs of inlet-ports for feeding the motive agent to the latter, and means for actuating said valve in synchronism with the pistons.

5. In a rotary engine, the combination with the cylinder having in its upper portion a series of inlet-ports arranged in pairs, said upper portion of the cylinder also having a pair of exhaust-ports arranged outside of the inlet-ports, lateral exhaust-ducts connecting the inlet-ports with the exhaust-ports, and valves arranged in said exhaust-ducts for controlling communication between the inlet-ports and the exhaust-ports, of a plurality of pistons rotatably mounted in said cylinder and arranged in separate compartments therein, one pair of said inlet-ports communicating with each of said compartments, an abutment slidably mounted between the inlet-ports of each pair and working against the periphery of the contiguous piston, a valve-chest arranged upon the upper portion of the cylinder, a tubular valve arranged therein for controlling the flow of the motive agent to said piston, said valve having a series of openings formed therein and registering consecutively with the respective pairs of inlet-ports for feeding the motive agent to the latter, means for actuating said valve in synchronism with the piston, a cut-off valve arranged in said tubular valve and coöperating with the openings thereof to regulate the degree of cut-off, and means for actuating said cut-off valve.

6. In a rotary engine, the combination with the cylinder having in its upper portion a series of inlet-ports arranged in pairs, said upper portion of the cylinder also having a pair of exhaust-ports arranged outside of the inlet-ports, lateral exhaust-ducts connecting the inlet-ports with the exhaust-ports, valves arranged in said exhaust-ducts for controlling communication between the inlet-ports and the exhaust-ports, the stems of said valves projecting beyond one end of the cylinder, and means connected to said projecting ends for simultaneously adjusting said valves, of a plurality of pistons rotatably mounted in said cylinder and arranged in separate compartments therein, one pair of said inlet-ports communicating with each of said compartments, an abutment slidably mounted between the inlet-ports of each pair and working against the periphery of the contiguous piston, a valve-chest arranged upon the upper portion of the cylinder, a valve arranged therein for controlling the flow of the motive agent to said piston, said valve having a series of openings formed therein and registering consecutively with the respective pairs of inlet-ports for feeding the motive agent to the latter, the stem of said valve also projecting at the exterior of the casing at the end opposite to that through which project the stems of the valves arranged in the exhaust-ducts, and means connected to said projecting end for actuating said valve in synchronism with the pistons.

7. In a rotary engine, the combination with the cylinder having in its upper portion a series of inlet-ports arranged in pairs, said upper portion of the cylinder also having a pair of exhaust-ports arranged outside of the inlet-ports, lateral exhaust-ducts connecting the inlet-ports with the exhaust-ports, valves arranged in said exhaust-ducts for controlling communication between the inlet-ports and the exhaust-ports, the stems of said valves projecting beyond one end of the cylinder, and means connected to said projecting ends for simultaneously adjusting said valves, of a plurality of pistons rotatably mounted in said cylinder and arranged in separate compartments therein, one pair of said inlet-ports communicating with each of said compartments, an abutment slidably mounted between the inlet-ports of each pair and working against the periphery of the contiguous piston, a valve-chest arranged upon the upper portion of the cylinder, a valve arranged therein for controlling the flow of the motive agent to said piston, said valve having a series of openings formed therein and registering consecutively with the respective pairs of inlet-ports for feeding the motive agent to the latter, the stem of said valve also projecting at the exterior of the casing at the end opposite to that through which project the stems of the valves arranged in the exhaust-ducts, a sprocket-wheel mounted upon said projecting end, a sprocket-wheel also connected to the shaft of the pistons, and a sprocket chain carried by said wheels for actuating said valve in synchronism with the pistons.

8. In a rotary engine, the combination with the cylinder having in its upper portion a series of inlet-ports arranged in pairs, said upper portion of the cylinder also having a pair of exhaust-ports arranged outside of the inlet-ports, lateral exhaust-ducts connecting the inlet-ports with the exhaust-ports, valves arranged in said exhaust-ducts for controlling communication between the inlet-ports and the exhaust-ports, the stems of said valves projecting beyond one end of the cylinder, and means connected to said projecting ends for simultaneously adjusting said valves, of a plurality of pistons rotatably mounted in said cylinder and arranged in separate compartments therein, one pair of said inlet-ports communicating with each of said compartments, an abutment slidably mounted between the inlet-ports of each pair and working against the periphery of the contiguous piston, a valve-chest arranged upon the upper portion of the cylinder, a tubular valve arranged therein for controlling the flow of the motive agent to the pistons, said valve having a series of openings formed therein and registering consecutively with the respective pairs of inlet-ports for feeding the motive agent to the latter, the stem of said tubular valve also projecting at the exterior of the casing at the end opposite to that through which project the stems of the valves arranged in the exhaust-ducts, means for actuating said valve in synchronism with the pistons, a cut-off valve arranged in said tubular valve and coöperating with the openings thereof to regulate the degree of cut-off, the stem of said valve projecting at the exterior of the casing contiguous to the projecting stems of the valves arranged in the exhaust-ducts, and means connected to said projecting stem for operating the cut-off valve.

In testimony whereof I affix my signature in presence of two subscribing witnesses.

LINUS A. HICKS.

Witnesses:
   WARREN D. HOUSE,
   HENRY F. ROSE.

It is hereby certified that Letters Patent No. 827,529, granted July 31, 1906, upon the application of Linus A. Hicks, of Kansas City, Missouri, for an improvement in "Rotary Engines," was erroneously issued to William R. Brewer, as owner of the entire interest in said invention; that said Letters Patent should have been issued to *the inventor, said Hicks and William R. Brewer, jointly,* said Brewer being the assignee of one-half interest only in said patent, as shown by the record of assignments in this office; and that the said Letters Patent should be read with this correction therein that the same may conform to the record of the case in the Patent Office.

Signed and sealed this 28th day of August, A. D., 1906.

[SEAL.]
E. B. MOORE,
*Acting Commissioner of Patents.*